US008621470B2

(12) United States Patent
Ruemmler et al.

(10) Patent No.: US 8,621,470 B2
(45) Date of Patent: Dec. 31, 2013

(54) WAKEUP-ATTRIBUTE-BASED ALLOCATION OF THREADS TO PROCESSORS

(75) Inventors: Christopher P. Ruemmler, Morgan Hill, CA (US); Colin Edward Honess, San Rafael, CA (US); Patrick O. Kilfoyle, Carnation, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1513 days.

(21) Appl. No.: 12/019,172

(22) Filed: Jan. 24, 2008

(65) Prior Publication Data

US 2009/0193423 A1    Jul. 30, 2009

(51) Int. Cl.
*G06F 9/46* (2006.01)
(52) U.S. Cl.
USPC ........................................................ 718/102
(58) Field of Classification Search
USPC ........................................................ 718/102
See application file for complete search history.

(56) References Cited

U.S. PATENT DOCUMENTS

| | | | | |
|---|---|---|---|---|
| 5,283,897 A | * | 2/1994 | Georgiadis et al. | 718/105 |
| 5,317,738 A | * | 5/1994 | Cochcroft et al. | 718/103 |
| 5,826,079 A | * | 10/1998 | Boland et al. | 718/102 |
| 7,076,781 B2 | * | 7/2006 | Skovira | 718/105 |
| 7,143,412 B2 | * | 11/2006 | Koenen | 718/102 |
| 7,159,216 B2 | * | 1/2007 | McDonald | 718/100 |
| 7,318,128 B1 | * | 1/2008 | Dice | 711/151 |
| 7,870,551 B2 | * | 1/2011 | Anand et al. | 718/1 |
| 8,051,418 B1 | * | 11/2011 | Dice | 718/102 |
| 2001/0042090 A1 | * | 11/2001 | Williams | 709/102 |
| 2003/0058608 A1 | * | 3/2003 | Ohuchi et al. | 361/600 |
| 2004/0019891 A1 | * | 1/2004 | Koenen | 718/102 |
| 2006/0130062 A1 | * | 6/2006 | Burdick et al. | 718/100 |
| 2007/0271564 A1 | * | 11/2007 | Anand et al. | 718/100 |
| 2007/0294693 A1 | * | 12/2007 | Barham | 718/102 |

* cited by examiner

*Primary Examiner* — Meng An
*Assistant Examiner* — James J Lee

(57) ABSTRACT

A method of co-locating threads and corresponding system are described. The method comprises a first thread executing on a first processor awakening a second thread for execution on a second processor and assigning the second thread to execute on the first processor based on a determination that the first thread awakened the second thread at a prior awakening of the second thread.

18 Claims, 6 Drawing Sheets

100

200

| ID 202 | PAT 204 | PWT 206 | TWS 208 | PA 210 |
|---|---|---|---|---|
| THREAD A | B | D | AWAKE | CPU1 |
| THREAD B | A | A | SLEEP | CPU2 |
| THREAD C | - | D | SLEEP | CPU1 |
| THREAD D | A | C | SLEEP | CPU1 |

102 → THREAD A
104 → THREAD B
212 → THREAD C
214 → THREAD D

FIG. 2

WAKEUP-ATTRIBUTE-BASED ALLOCATION OF THREADS TO PROCESSORS

BACKGROUND

When threads of execution share data in a computer system, the threads may have to stall execution waiting for the data to be retrieved from its last accessed location. On an multi-processor system, chances are high that each thread of execution sharing the data is executing on different processors. Thus, as each thread accesses the data it needs it has to retrieve it from another processor. This operation can take several cycles and may result in the requesting thread to stall execution while the data is being retrieved. Performance can then be reduced as threads stall waiting for shared data. Contention can also increase if these extra stalls occur during execution of critical sections of code.

Prior attempts at co-locating threads have been more specific in nature and require manual intervention. For example, gang scheduling techniques have been applied to schedule all threads in a specified "gang" at the same time on separate processors. An administrator has to determine what threads belong to a gang. Other techniques manually bind a group of threads to given areas of a computer system (a processor, a locality, etc.) but these are manual and require operator intervention. Other prior attempts have relied on noting a "home" locality for a thread based on where most of the memory accessed by the thread resides and trying to keep that thread in the home locality. These techniques rely on operator intervention to indicate which threads to co-locate and how to perform the co-location. Often, the access patterns between threads may change or the operator has no idea how the threads should be organized resulting in non-optimal allocation and performance.

DESCRIPTION OF THE DRAWINGS

One or more embodiments are illustrated by way of example, and not by limitation, in the figures of the accompanying drawings, wherein elements having the same reference numeral designations represent like elements throughout and wherein:

FIG. 2 is a high-level functional block diagram of a thread attribute collection according to another embodiment;

DETAILED DESCRIPTION

Information regarding which threads may be sharing data may enable co-locating threads on the same processor. In at least some embodiments, sharing of data by threads, e.g., as indicated by a thread sleeping until data becomes available and being woken up after the data becomes available, may be determined by monitoring sleep/wake patterns and determining candidates for thread co-location based thereon.

Figure 1:
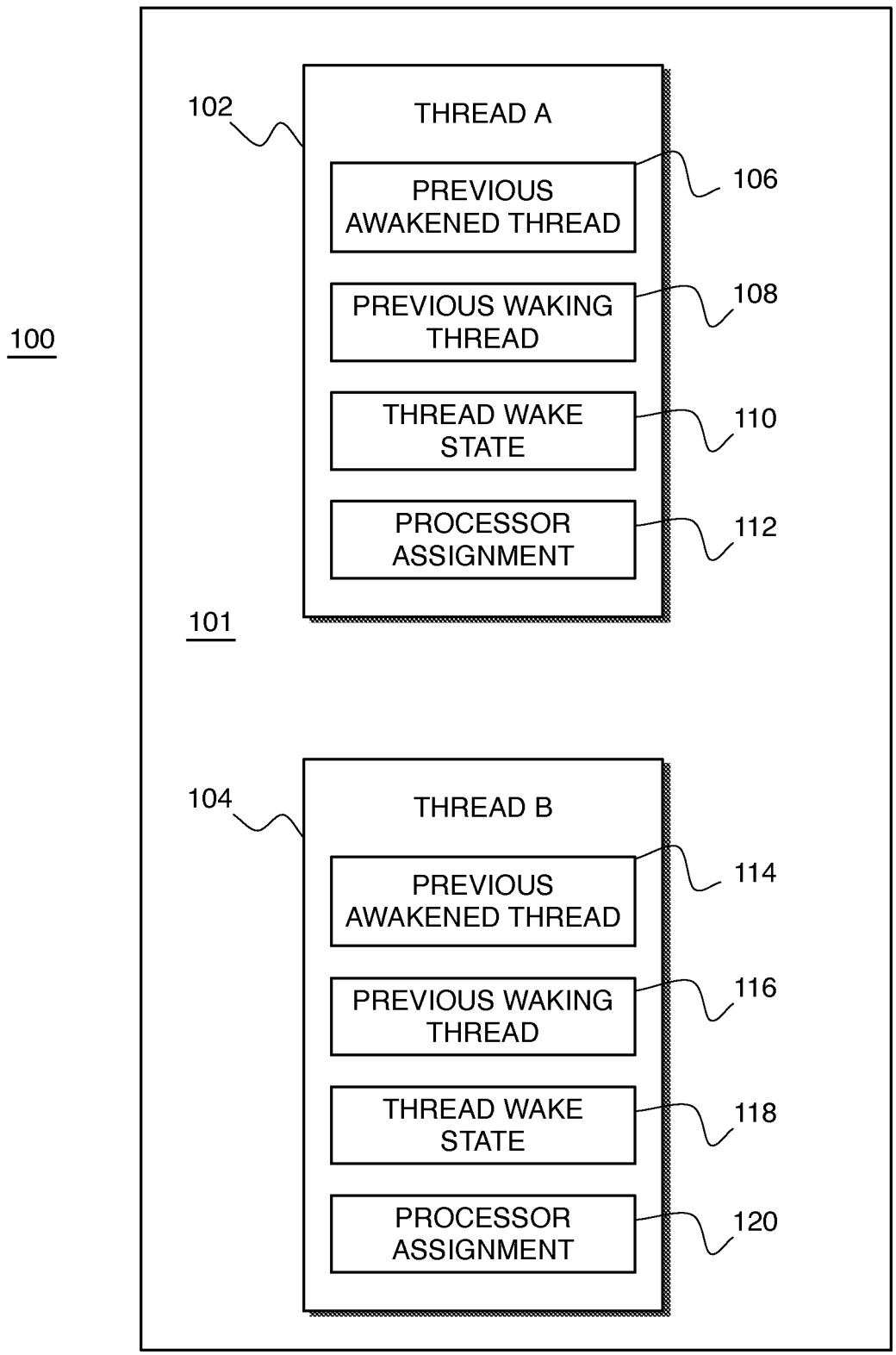
FIG. 1 is a high-level functional block diagram of a thread attribute collection according to an embodiment.

FIG. 1 depicts a high-level functional block diagram of a portion of a memory 100 storing a thread attribute collection 101 comprising two thread attribute sets 102, 104 corresponding to two threads. A pattern-based thread co-location system (PTCS) determines the allocation of the threads corresponding to thread attribute sets 102, 104 to two or more processors based on a thread attribute of the one or more of thread attribute sets stored in memory 100. In at least some embodiments, the PTCS determines the allocation based on at least one thread attribute. In at least some embodiments, the PTCS determines the allocation based on more than one thread attribute. For clarity and ease of description, two thread attribute sets are described herein. In some embodiments, there may be a greater or lesser number of thread attribute sets. In at least some embodiments, the thread attribute sets 102, 104 may replace thread attribute collection 101, i.e., memory 100 may store the thread attribute sets without the use of a thread attribute collection.

Thread attribute set 102 corresponds to attributes of a first thread, i.e., Thread A, and thread attribute set 104 corresponds to attributes of a second thread, i.e., Thread B. Thread attribute set 102 comprises a previous awakened thread (PAT) attribute 106, a previous waking thread (PWT) attribute 108, a thread wake state (TWS) attribute 110, and a processor assignment (PA) attribute 112. Similarly, thread attribute set 104 comprises a PAT attribute 114, a PWT attribute 116, a TWS attribute 118, and a PA attribute 120.

PAT attribute 106 comprises a value indicating the previous thread which was awakened by the thread corresponding to thread attribute set 102, i.e., the last thread which Thread A woke up. In at least some embodiments, PAT attribute 106 may be a value, a reference, a pointer or another mechanism for identifying another thread.

PWT attribute 108 comprises a value indicating the previous thread which awakened Thread A. In at least some embodiments, PWT attribute 108 may be a value, a reference, a pointer or another mechanism for identifying another thread.

TWS attribute 110 comprises a value indicating whether Thread A is awake or sleeping. In at least some embodiments, TWS attribute 110 may be a numeric, alphabetic, alphanumeric, binary, octal, decimal, hexadecimal, or other value for identifying the wake state of Thread A.

PA attribute 112 comprises a value indicating to which processor Thread A is assigned for execution. In at least some embodiments, PA attribute 112 may be an alphabetic, numeric, alphanumeric, binary, octal, decimal, hexadecimal, or other value for identifying the processor assignment. In at least some embodiments, PA attribute 112 comprises a smallest possible scheduling unit within a processor for executing a thread, e.g., the PA attribute may refer to a processor, a core in a processor having multiple cores, a thread in a core in a processor.

In at least some other embodiments, the thread attribute sets 102, 104 may comprise a processor usage attribute for storing a value indicative of the processor usage of the corresponding thread, i.e., Thread A or Thread B.

FIG. 2 depicts a high-level diagram of a portion of memory 100 storing a thread attribute collection 200 according to another embodiment in which the collection is a table for storing the thread attribute sets. Thread attribute collection 200 comprises thread attribute sets as row entries and the attributes as columns.

Thread attribute collection 200 comprises a thread identifier attribute 202 for storing an identifier of the particular thread corresponding to the thread attribute set, and a PAT attribute 204, PWT attribute 206, a TWS attribute 208, and a PA attribute 210 which each correspond to the thread attributes 106, 108, 110, and 112 of FIG. 1. Two additional thread attribute sets 212, 214 have been added to collection 200 as additional examples.

Thread attribute set 102 stores a value of B in PAT attribute 204 indicating that the last thread awakened by Thread A was Thread B. Thread attribute set 102 stores a value of D in PWT attribute 206 indicating that the last thread which awakened Thread A was Thread D corresponding to thread attribute set 214. Thread attribute set 102 stores a value of AWAKE in TWS attribute 208 and a value of CPU1 in PA attribute 210 indicating, respectively, that Thread A is in an awake state and that the thread is assigned to a first processor.

Of note, thread attribute set 212 stores a null value in PAT attribute 204 indicating that the thread was not previously awakened by another of the threads.

Figure 3:
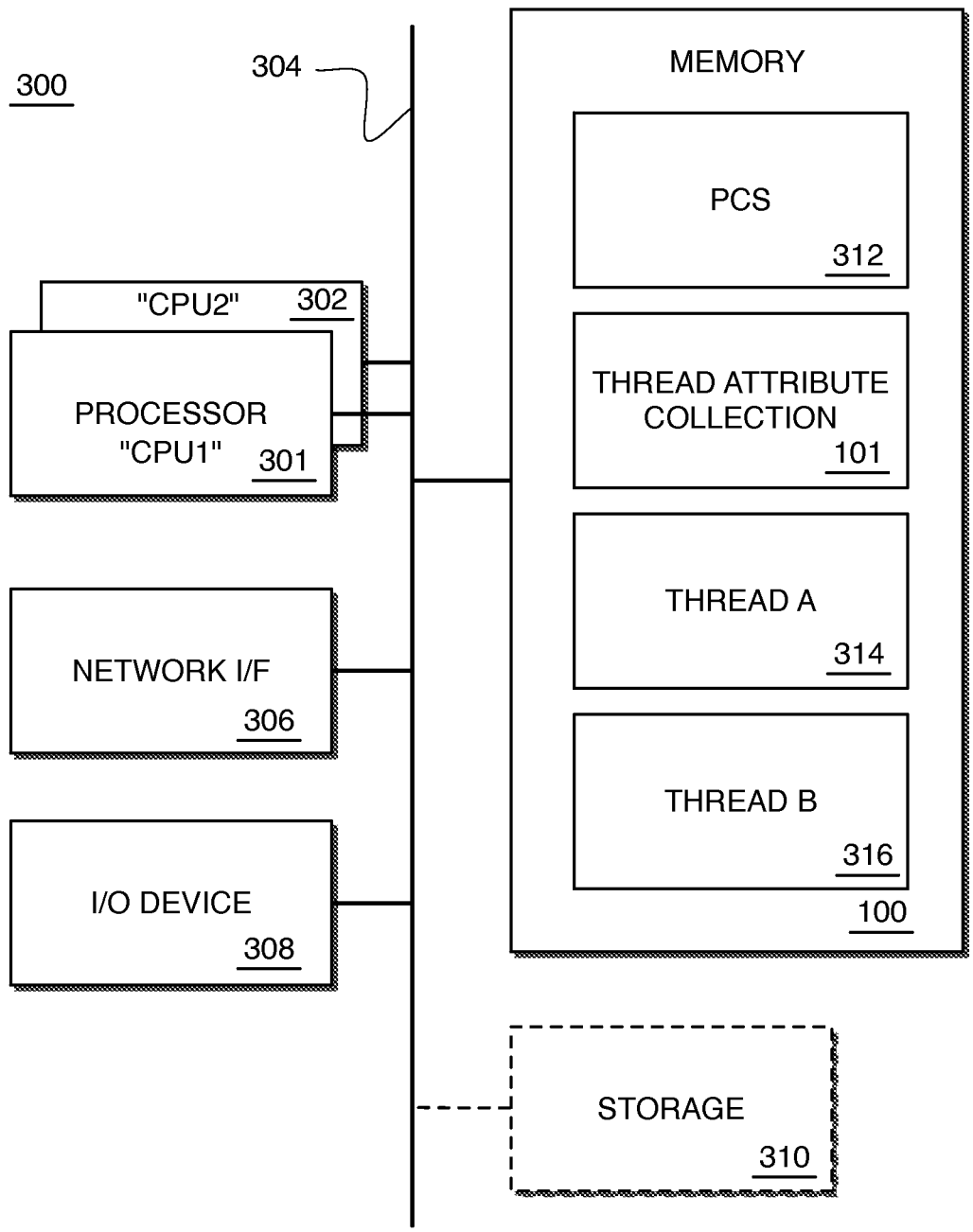
FIG. 3 is a high-level block diagram of a system on which an embodiment may be executed to advantage.

FIG. 3 depicts a high-level functional block diagram of a computer system 300 usable in conjunction with one or more embodiments. Computer system 300 comprises a pair of processors 301, 302, a memory 100, a network interface (I/F) 304, a storage 310, and an input/output (I/O) device 308 communicatively coupled via a bus 304 or other interconnection communication mechanism.

Memory 100 (also referred to as a computer-readable medium) may comprise a random access memory (RAM) or other dynamic storage device, coupled to the bus 304 for storing data and instructions to be executed by processors 301, 302, e.g., a pattern-based co-location system (PCS) 312. Memory also comprises a first thread (Thread A 314) and a second thread (Thread B 316) for execution by processors 301, 302. Threads A and B 314, 316 correspond to thread attribute sets 102, 104.

Memory 100 also may be used for storing temporary variables or other intermediate information during execution of instructions to be executed by processors 301, 302. Memory 100 may also comprise a read only memory (ROM) or other static storage device coupled to the bus 304 for storing static information and instructions for the processors 301, 302.

Processors 301, 302 execute instructions read from memory 100 such as threads 314, 316, and PCS 312. Processors 301, 302 may also be referenced as central processing unit ("CPU1") one and ("CPU2") two, respectively. In at least some embodiments, computer system 300 may comprise greater or lesser numbers of processors. In at least some embodiments, processors 301, 302 may comprise one or more processing cores for executing threads 314, 316. In at least some embodiments, processors 301, 302 may comprise processing cores of a single processor.

Network I/F 306 comprises a mechanism for connecting to another device. In at least some embodiments, computer system 300 comprises more than a single network interface.

A storage device (storage 310), such as a magnetic disk or optical disk, may also be provided and coupled to the bus 304 for storing data such as PCS 312, thread attribute collection 101, thread A 314, thread B 316, and other data and/or instructions.

I/O device 308 may comprise an input device, an output device and/or a combined input/output device for enabling user interaction with computer system 300. An input device may comprise, for example, a keyboard, keypad, mouse, trackball, trackpad, and/or cursor direction keys for communicating information and commands to processors 301, 302. An output device may comprise, for example, a display, a printer, a voice synthesizer, etc. for communicating information to a user.

The functions of a method described in connection with the embodiments disclosed herein may be embodied in hardware, software, or a combination thereof. Software comprising instructions for execution may reside in a computer-readable medium comprising volatile and/or non-volatile memory, e.g., a random access memory, a read only memory, a programmable memory, a hard disk, a compact disc, or another form of storage medium readable, directly or indirectly, by a processing device.

Figure 4:
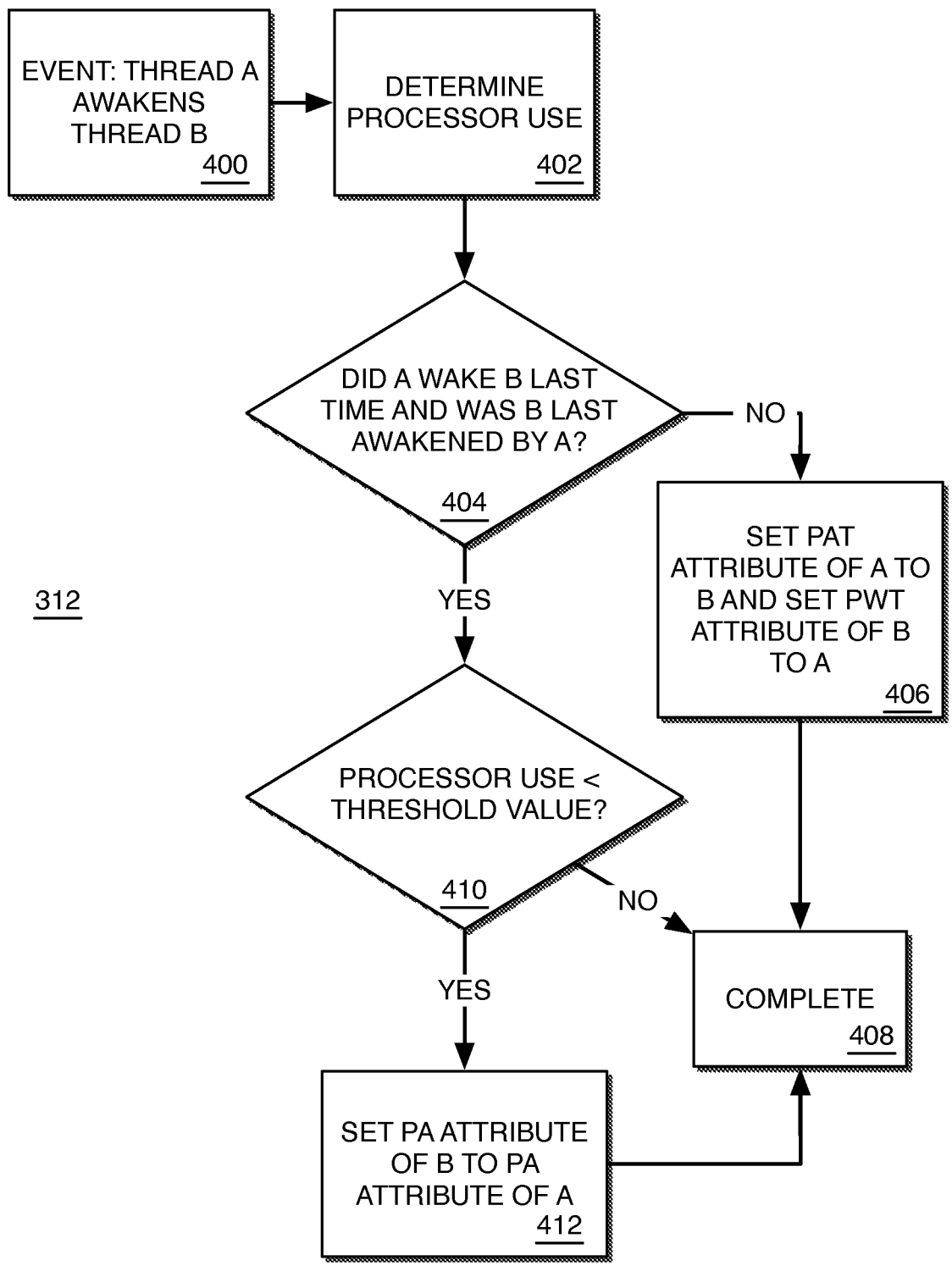
FIG. 4 is a high-level process flow diagram of a method according to an embodiment.

FIG. 4 depicts a high-level process flow diagram of at least a portion of a method corresponding to functionality of PCS 312 according to an embodiment. PCS 312 may be executed by either of processors 301, 302. For clarity and ease of description, processor 301 is described as executing PCS 312 in the following embodiments.

The process flow begins with event 400 wherein execution of Thread A 314 by processor 301 causes Thread B 316 to awake and be allocated to processor 302 based on the content of PA attribute 120 of thread attribute set 104.

The flow proceeds to determine processor use functionality 402 wherein processor 301 executing a set of instructions determines the sum of the processor usage of Thread A 314 and Thread B 316 on the respective processors, i.e., 301 and 302. The flow proceeds to waking determination functionality 404.

During waking determination functionality 404, processor 301 executing a set of executable instructions determines whether Thread A 314 awakened Thread B at a prior awakening of Thread A 314 by reference to thread attribute collection 101, and more specifically, by reference to the value stored in PAT attribute 106 of thread attribute set 102. In at least some embodiments, the prior awakening of Thread A 314 corresponds to the penultimate awakening of the Thread A, i.e., the awakening just prior to the event causing Event functionality 400.

Also during waking determination functionality 404, processor 301 executing a set of executable instructions determines whether Thread B 316 was last (most recently) awakened (prior awakening) by Thread A 314. Whether Thread B 316 was last awakened by Thread A 314 is determined by reference to thread attribute set 104, and more specifically, PWT attribute 116 of the thread attribute set corresponding to Thread B. In at least some embodiments, the last awakening of Thread B 316 corresponds to the penultimate awakening of the Thread B, i.e., the awakening just prior to the event causing Event functionality 400.

If the result of waking determination functionality 404 is negative ("NO"), the flow proceeds to set last thread awakened functionality 406. During functionality 406, processor 301 executing a set of executable instructions stores a value indicating that the prior awakened thread of Thread A 314 is Thread B 316, i.e., PAT attribute 106 is set to a value indicative of Thread B ("B"), and also processor 301 stores a value indicating that the prior thread which awakened Thread B was Thread A, i.e., PWT 116 is set to a value indicative of Thread A ("A"). The flow then proceeds to complete functionality 408.

Returning to functionality 404, if the result of the waking determination functionality 404 is positive ("YES"), the flow proceeds to compare processor threshold functionality 410. During compare processor threshold functionality 410, processor 301 executing a set of executable instructions compares the result of determine processor use functionality 402 to a predetermined processor threshold value, e.g., as stored in a threshold value in memory 100. That is, the sum of the processor usage of the threads (Thread A 314 and Thread B 316) is compared to the predetermined processor threshold value. In at least some embodiments, the thread processor usage is compared in order to determine if the threads are consuming more than a predetermined amount of processing resources such that co-location of the threads may not be beneficial to overall system operation.

If the result of functionality 410 is negative ("NO"), the flow proceeds to complete functionality 408.

If the result of functionality 410 is positive ("YES"), the flow proceeds to processor assignment update functionality 412. During functionality 412, processor 301 executing a set of executable instructions stores the PA attribute 112 value to PA attribute 120 of thread attribute set 104. That is, the processor sets the processor assignment of Thread B to be the same as the processor assignment of Thread A. Modification of the PA attribute 120 causes processor 301 to allocate Thread B for execution on the same processor as Thread A 314, i.e., CPU1 (processor 301). In at least some embodiments, modification of the PA attribute 120 takes effect on a subsequent awakening of Thread B 316. The flow proceeds to complete functionality 408.

In at least some embodiments, subsequent to modification of PA attribute 120, processor 301 increases the priority of Thread A, e.g., by modification of a priority attribute of thread attribute set 102, to match the priority of Thread B in order to prevent Thread B from immediately preempting execution of Thread A.

Figure 5:
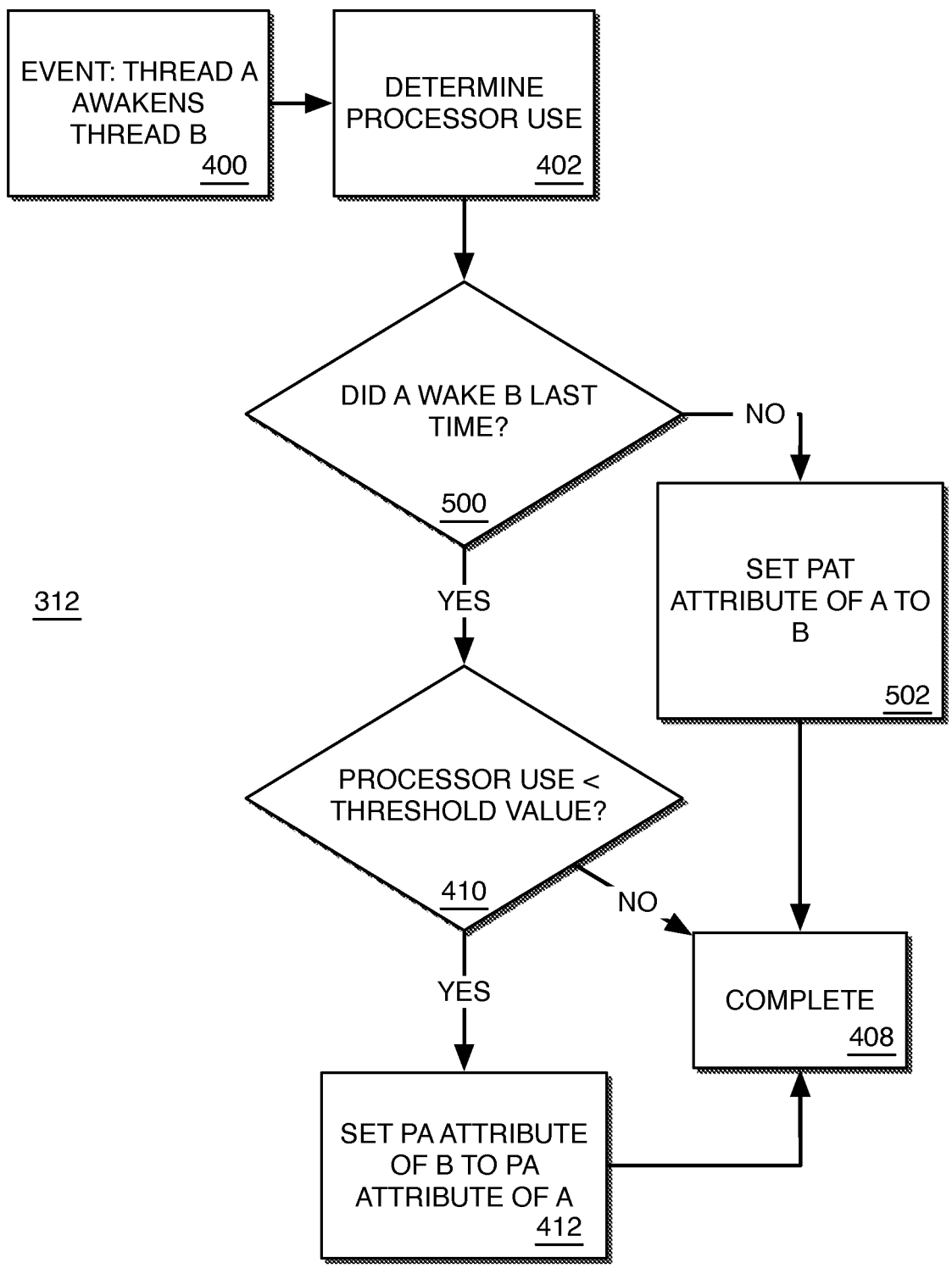
FIG. 5 is a high-level process flow diagram of a method according to another embodiment.

FIG. 5 depicts a high-level process flow diagram of at least a portion of a method corresponding to functionality of PCS 312 according to another embodiment. PCS 312 may be executed by either of processors 301, 302. For clarity and ease of description, processor 301 is described as executing PCS 312 in the following embodiments.

The process flow begins with event 400 wherein execution of Thread A 314 by processor 301 causes Thread B 316 to awake and be allocated to processor 302 based on the content of PA attribute 120 of thread attribute set 104.

The flow proceeds to determine processor use functionality 402 wherein processor 301 executing a set of instructions determines the sum of the processor usage of Thread A 314 and Thread B 316 on the respective processors, i.e., 301 and 302. The flow proceeds to waking determination functionality 500.

During waking determination functionality 500, processor 301 executing a set of executable instructions determines whether Thread A 314 awakened Thread B at a prior awakening of Thread A 314 by reference to thread attribute collection 101, and more specifically, by reference to the value stored in PAT attribute 106 of thread attribute set 102. In at least some embodiments, the prior awakening of Thread A 314 corresponds to the penultimate awakening of the Thread A, i.e., the awakening just prior to the event causing Event functionality 400.

If the result of waking determination functionality 500 is negative ("NO"), the flow proceeds to set last thread awakened functionality 502. During functionality 502, processor 301 executing a set of executable instructions stores a value indicating that the prior awakened thread of Thread A 314 is Thread B 316, i.e., PAT attribute 106 is set to a value indicative of Thread B ("B"). The flow then proceeds to complete functionality 408.

Returning to functionality 500, if the result of the waking determination functionality 500 is positive ("YES"), the flow proceeds to compare processor threshold functionality 410. During compare processor threshold functionality 410, processor 301 executing a set of executable instructions compares the result of determine processor use functionality 402 to a predetermined processor threshold value, e.g., as stored in a threshold value in memory 100. That is, the sum of the processor usage of the threads (Thread A 314 and Thread B 316) is compared to the predetermined processor threshold value. In at least some embodiments, the thread processor usage is compared in order to determine if the threads are consuming more than a predetermined amount of processing resources such that co-location of the threads may not be beneficial to overall system operation.

If the result of functionality 410 is negative ("NO"), the flow proceeds to complete functionality 408.

If the result of functionality 410 is positive ("YES"), the flow proceeds to processor assignment update functionality 412. During functionality 412, processor 301 executing a set of executable instructions stores the PA attribute 112 value to PA attribute 120 of thread attribute set 104. That is, the processor sets the processor assignment of Thread B to be the same as the processor assignment of Thread A. Modification of the PA attribute 120 causes processor 301 to allocate Thread B for execution on the same processor as Thread A 314, i.e., CPU1 (processor 301). In at least some embodiments, modification of the PA attribute 120 takes effect on a subsequent awakening of Thread B 316. The flow proceeds to complete functionality 408.

In at least some embodiments, subsequent to modification of PA attribute 120, processor 301 increases the priority of Thread A, e.g., by modification of a priority attribute of thread attribute set 102, to match the priority of Thread B in order to prevent Thread B from immediately preempting execution of Thread A.

Figure 6:
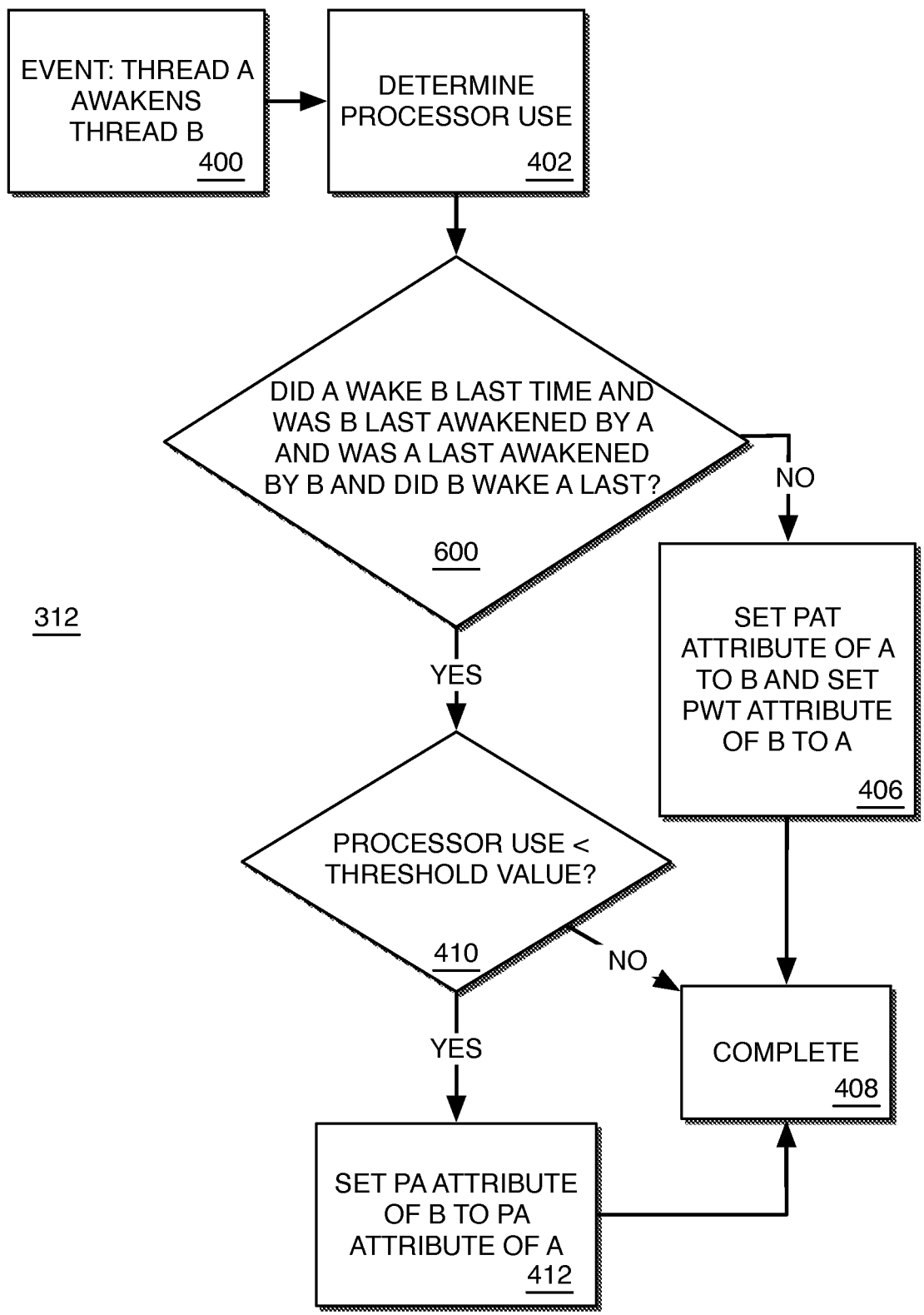
FIG. 6 is a according to another embodiment.

FIG. 6 depicts a high-level process flow diagram of at least a portion of a method corresponding to functionality of PCS 312 according to a variation on the FIG. 4 embodiment. Execution of the process flow of FIG. 6 proceeds as described in accordance with FIG. 4; however, waking determination functionality 404 is modified to additionally determine whether Thread A was last awakened by Thread B and to determine whether Thread B awakened Thread A at a prior awakening of Thread A. The additional determinations are performed by reference to the values stored in PWT attribute 108 of thread attribute set 102 and PAT attribute 114 of thread attribute set 104. The flow then proceeds as described with respect to FIG. 4.

What is claimed is:

1. A method comprising:
putting a first thread executing on a first processor into a most-recent sleep while a second thread executes on a second processor separate from said first processor;
while said first thread is asleep, said second thread awakening said first thread;
in response to said awakening, causing thread attributes including,
a previous-awakened-thread attribute of said first thread to indicate that said second thread was the thread that was most-recently awakened by said first thread,
a previous-waking-thread attribute of said second thread to indicate that said first thread was the thread that was most recently awakened by said second thread; and
a processor-assignment attribute of said first thread to indicate whether or not said first thread is to be allocated to said second processor based at least in part on said previous-awakened-thread attribute of said first thread and said previous-waking thread attribute of said second thread; and
allocating said first thread to a processor based on its processor-assignment attribute.

2. A method as recited in claim 1 wherein said causing said processor-assignment attribute of said first thread to indicate whether or not said first thread is to be allocated to said second processor is also based on:
a previous-waking-thread attribute of said first thread that indicates whether or not said second thread was the last thread to awaken said first thread; and a previous-awakened-thread attribute of said second thread that indicates whether or not said first thread was the last thread awakened by said second thread.

3. A method as recited in claim 1 wherein, in the event said processor-assignment attribute of said first thread is caused to change from indicating said first processor to indicating said second processor, said first thread is not allocated to said second processor in response to the change until said first thread is subsequently awakened.

4. A system comprising non-transitory computer-readable media encoded with code configured to, when executed by a processor:
- put a first thread executing on a first processor into a most-recent sleep while a second thread executes on a second processor separate from said first processor;
- while said first thread is asleep, cause said second thread to awaken said first thread;
- in response to the awakening, cause thread attributes including,
  - a previous-awakened-thread attribute of said first thread to indicate that said second thread was the thread that was most-recently awakened by said first thread,
  - a previous-waking-thread attribute of said second thread to indicate that said first thread was the thread that was most recently awakened by said second thread; and
  - a processor-assignment attribute of said first thread to indicate whether or not said first thread is to be allocated to said second processor based at least in part on said previous-awakened-thread attribute of said first thread and said previous-waking thread attribute of said second thread; and
- allocate said first thread to a processor based on its processor-assignment attribute.

5. A system as recited in claim 4 further comprising said processor.

6. A system as recited in claim 4 wherein the causing said processor-assignment attribute of said first thread to indicate whether or not said first thread is to be allocated to said second processor is also based on:
- a previous-waking-thread attribute of said first thread that indicates whether or not said second thread was the last thread to awaken said first thread; and
- a previous-awakened-thread attribute of said second thread that indicates whether or not said first thread was the last thread awakened by said second thread.

7. A system as recited in claim 4 wherein, in the event said processor assignment attribute of said first thread is caused to change from indicating said first processor to indicating said second processor, said code does not allocate said first thread to said second processor in response to the change until said first thread is subsequently awakened.

8. The system as claimed in claim 4 wherein said thread attributes include a previous awakened thread attribute indicating a previous thread awakened by the thread to which the attributes correspond.

9. The system as claimed in claim 4, wherein said thread attributes include a thread wake state attribute indicating a wake state of the thread to which the attribute corresponds.

10. The system as claimed in claim 4, wherein said processor is further configured to include a set of instructions which, when executed by said processor, cause said processor to perform the assignment of the first thread based on a determination that a processor usage value of said first processor on which the first thread is executing exceeds a predetermined usage threshold.

11. The system as claimed in claim 10, wherein the set of instructions includes instructions which, when executed by said processor, cause said processor to assign said first thread to the same processor on which a second thread of said threads is assigned based in part on a determination that said first thread awakened said second thread at a prior awakening of said second thread.

12. The system as claimed in claim 10, wherein the set of instructions include instructions which, when executed by said processor, cause said processor to perform the assignment of the first thread further based on a determination that the first thread was awakened by the second thread at a prior awakening of the first thread.

13. The system as claimed in claim 12, wherein the prior awakening of the first thread is a penultimate awakening of the first thread.

14. A non-transitory computer-readable medium storing instructions which, when executed by a processor, cause the processor to perform the method of claim 1.

15. The method as claimed in claim 1, wherein a determination that said first thread awakened said second thread at a most-recent awakening of said second thread is performed based on a thread attribute corresponding to the first thread which indicates a previous thread that awakened said first thread.

16. The method as claimed in claim 1, wherein the allocating of said first thread is further performed based on a determination that the combined processor usage of the first thread and the second thread falls below a predetermined usage threshold.

17. The method as claimed in claim 1, wherein said awakening of the second thread is a penultimate awakening of the second thread.

18. The method as claimed in claim 16, wherein the allocating is further performed based on a determination that the first thread was awakened by the second thread at a prior awakening of the first thread.

* * * * *

UNITED STATES PATENT AND TRADEMARK OFFICE
CERTIFICATE OF CORRECTION

Page 1 of 1

PATENT NO. : 8,621,470 B2
APPLICATION NO. : 12/019172
DATED : December 31, 2013
INVENTOR(S) : Christopher P. Ruemmler et al.

It is certified that error appears in the above-identified patent and that said Letters Patent is hereby corrected as shown below:

On the Title page, Item (54), and in the Specification, in column 1, lines 1-2, Title, delete "WAKEUP-ATTRIBUTE-BASED ALLOCATION OF THREADS TO PROCESSORS" and insert -- CO-LOCATING THREADS ON A PROCESSOR BASED ON WAKEUP-ATTRIBUTES OF THE THREADS --, therefor.

In the Claims

In column 7, line 48, in Claim 7, delete "processor assignment" and insert -- processor-assignment --, therefor.

In column 8, line 2, in Claim 8, delete "previous awakened" and insert -- previous-awakened --, therefor.

Signed and Sealed this
Twenty-seventh Day of May, 2014

Michelle K. Lee
*Deputy Director of the United States Patent and Trademark Office*